(12) United States Patent
Kliger et al.

(10) Patent No.: US 7,742,495 B2
(45) Date of Patent: Jun. 22, 2010

(54) SYSTEM AND METHOD FOR RETRANSMITTING PACKETS OVER A NETWORK OF COMMUNICATION CHANNELS

(75) Inventors: Avi Kliger, Ramat Gan (IL); Yitshak Ohana, Givat Ze'ev (IL)

(73) Assignee: Broadcom Corporation, Irvine, CA (US)

(*) Notice: Subject to any disclaimer, the term of this patent is extended or adjusted under 35 U.S.C. 154(b) by 236 days.

(21) Appl. No.: 11/942,114

(22) Filed: Nov. 19, 2007

(65) Prior Publication Data

US 2008/0117929 A1 May 22, 2008

Related U.S. Application Data (60) Provisional application No. 60/866,532, filed on Nov. 20, 2006, provisional application No. 60/866,527, filed on Nov. 20, 2006, provisional application No. 60/866,519, filed on Nov. 20, 2006, provisional application No. 60/907,111, filed on Mar. 21, 2007, provisional application No. 60/907,126, filed on Mar. 22, 2007, provisional application No. 60/907,819, filed on Apr. 18, 2007, provisional application No. 60/940,998, filed on May 31, 2007.

(51) Int. Cl.
   H04B 7/212 (2006.01)
(52) U.S. Cl. ...................................... 370/442
(58) Field of Classification Search ......... 370/442, 370/443, 445, 447, 468, 449, 458, 462, 455, 370/461, 493, 471, 465, 341, 329, 352, 376, 370/347, 348, 349, 395.3, 395.4; 725/111, 725/80; 375/222
See application file for complete search history.

(56) References Cited

U.S. PATENT DOCUMENTS

| | | | |
|---|---|---|---|
| 3,836,888 A | | 9/1974 | Boenke et al. |
| 4,413,229 A | | 11/1983 | Grant |
| 4,536,875 A | * | 8/1985 | Kume et al. .................. 370/448 |
| 4,608,685 A | | 8/1986 | Jain et al. |
| 4,893,326 A | | 1/1990 | Duran et al. |
| 5,052,029 A | | 9/1991 | James et al. |

(Continued)

FOREIGN PATENT DOCUMENTS

EP  0 385695  9/1990

(Continued)

OTHER PUBLICATIONS

International Search Report for International Application No. PCT/US03/27253 dated Dec. 30, 2003 (5 pgs.).

(Continued)

*Primary Examiner*—Chi H Pham
*Assistant Examiner*—Alexander Boakye
(74) *Attorney, Agent, or Firm*—Weiss & Arons, LLP (57) ABSTRACT

A system for transmitting packets over a network of communication channels, the system comprising a set of nodes comprising at least first and second nodes and a network access coordinator operative to coordinate the access of the set of nodes to a synchronous network of channels, wherein, if at least one individual packet has been transmitted from the first node to the second node which did not receive at least one packet, the second node is operative to send a retransmission request to the network access coordinator requesting retransmission of at least one individual packet.

19 Claims, 5 Drawing Sheets

U.S. PATENT DOCUMENTS

| | | |
|---|---|---|
| 5,343,240 A | 8/1994 | Yu |
| 5,421,030 A | 5/1995 | Baran |
| 5,440,335 A | 8/1995 | Beveridge |
| 5,671,220 A | 9/1997 | Tonomura |
| 5,796,739 A | 8/1998 | Kim et al. |
| 5,802,173 A | 9/1998 | Hamilton-Piercy et al. |
| 5,805,591 A | 9/1998 | Naboulsi et al. |
| 5,805,806 A | 9/1998 | McArthur |
| 5,815,662 A | 9/1998 | Ong |
| 5,822,677 A | 10/1998 | Peyrovian |
| 5,822,678 A | 10/1998 | Evanyk |
| 5,845,190 A | 12/1998 | Bushue et al. |
| 5,850,400 A | 12/1998 | Eames et al. |
| 5,854,887 A | 12/1998 | Kindell et al. |
| 5,856,975 A | 1/1999 | Rostoker et al. |
| 5,877,821 A | 3/1999 | Newlin et al. |
| 5,886,732 A | 3/1999 | Humpleman |
| 5,896,556 A | 4/1999 | Moreland et al. |
| 5,917,624 A | 6/1999 | Wagner |
| 5,930,493 A | 7/1999 | Ottesen et al. |
| 5,963,844 A | 10/1999 | Dail |
| 5,982,784 A | 11/1999 | Bell |
| 6,009,465 A | 12/1999 | Decker et al. |
| 6,055,242 A | 4/2000 | Doshi et al. |
| 6,069,588 A | 5/2000 | O'Neill, Jr. |
| 6,081,519 A | 6/2000 | Petler |
| 6,081,533 A | 6/2000 | Laubach et al. |
| 6,118,762 A | 9/2000 | Nomura et al. |
| 6,157,645 A | 12/2000 | Shobatake |
| 6,167,120 A | 12/2000 | Kikinis |
| 6,219,409 B1 | 4/2001 | Smith et al. |
| 6,229,818 B1 | 5/2001 | Bell |
| 6,243,413 B1 | 6/2001 | Beukema |
| 6,304,552 B1 | 10/2001 | Chapman et al. |
| 6,307,862 B1 | 10/2001 | Silverman |
| 6,466,651 B1 | 10/2002 | Dailey |
| 6,481,013 B1 | 11/2002 | Dinwiddie et al. |
| 6,526,070 B1 | 2/2003 | Bernath et al. |
| 6,553,568 B1 | 4/2003 | Fijolek et al. |
| 6,563,829 B1 | 5/2003 | Lyles et al. |
| 6,611,537 B1 | 8/2003 | Edens et al. |
| 6,622,304 B1 | 9/2003 | Carhart |
| 6,637,030 B1 | 10/2003 | Klein |
| 6,650,624 B1 | 11/2003 | Quigley et al. |
| 6,745,392 B1 | 6/2004 | Basawapatna et al. |
| 6,763,032 B1 | 7/2004 | Rabenko et al. |
| 6,816,500 B1 * | 11/2004 | Mannette et al. ............ 370/431 |
| 6,831,899 B1 | 12/2004 | Roy |
| 6,862,270 B1 | 3/2005 | Ho |
| 6,950,399 B1 | 9/2005 | Bushmitch et al. |
| 6,985,437 B1 | 1/2006 | Vogel |
| 7,035,270 B2 | 4/2006 | Moore et al. |
| 7,065,779 B1 | 6/2006 | Crocker et al. |
| 7,089,580 B1 | 8/2006 | Vogel et al. |
| 7,116,685 B2 | 10/2006 | Brown et al. |
| 7,127,734 B1 | 10/2006 | Amit |
| 7,133,697 B2 | 11/2006 | Judd et al. |
| 7,146,632 B2 | 12/2006 | Miller |
| 7,296,083 B2 | 11/2007 | Barham et al. |
| 7,487,532 B2 * | 2/2009 | Robertson et al. ............ 725/111 |
| 7,606,256 B2 * | 10/2009 | Vitebsky et al. ............. 370/439 |
| 2001/0039660 A1 | 11/2001 | Valsilevsky |
| 2002/0010562 A1 | 1/2002 | Schleiss et al. |
| 2002/0021465 A1 | 2/2002 | Moore et al. |
| 2002/0059623 A1 | 5/2002 | Rodriguez et al. |
| 2002/0059634 A1 | 5/2002 | Terry et al. |
| 2002/0078247 A1 | 6/2002 | Lu et al. |
| 2002/0078249 A1 | 6/2002 | Lu et al. |
| 2002/0097821 A1 | 7/2002 | Hebron et al. |
| 2002/0136231 A1 | 9/2002 | Leatherbury |
| 2002/0141347 A1 | 10/2002 | Harp et al. |
| 2002/0150155 A1 | 10/2002 | Florentin et al. |
| 2002/0166124 A1 | 11/2002 | Gurantz et al. |
| 2002/0174423 A1 | 11/2002 | Fifield et al. |
| 2002/0194605 A1 | 12/2002 | Cohen et al. |
| 2003/0013453 A1 | 1/2003 | Lavaud et al. |
| 2003/0016751 A1 | 1/2003 | Vetro et al. |
| 2003/0063563 A1 | 4/2003 | Kowalski |
| 2003/0152059 A1 | 8/2003 | Odman |
| 2003/0169769 A1 | 9/2003 | Ho et al. |
| 2003/0193619 A1 | 10/2003 | Farrand |
| 2003/0198244 A1 | 10/2003 | Ho et al. |
| 2004/0107445 A1 | 6/2004 | Amit |
| 2004/0163120 A1 | 8/2004 | Rabenko et al. |
| 2004/0258062 A1 | 12/2004 | Narvaez |
| 2005/0015703 A1 | 1/2005 | Terry et al. |
| 2005/0152359 A1 | 7/2005 | Giesberts et al. |
| 2005/0175027 A1 | 8/2005 | Miller et al. |
| 2005/0204066 A9 | 9/2005 | Cohen et al. |
| 2005/0213405 A1 | 9/2005 | Stopler |
| 2006/0062250 A1 | 3/2006 | Payne, III |
| 2006/0078001 A1 | 4/2006 | Chandra et al. |
| 2006/0256799 A1 | 11/2006 | Eng |
| 2006/0256818 A1 | 11/2006 | Shvodian et al. |
| 2006/0268934 A1 | 11/2006 | Shimizu et al. |
| 2006/0280194 A1 | 12/2006 | Jang et al. |
| 2007/0025317 A1 | 2/2007 | Bolinth et al. |
| 2007/0127373 A1 | 6/2007 | Ho et al. |
| 2007/0160213 A1 | 7/2007 | Un et al. |
| 2007/0206551 A1 | 9/2007 | Moorti et al. |
| 2008/0189431 A1 | 8/2008 | Hyslop et al. |
| 2009/0010263 A1 | 1/2009 | Ma et al. |

FOREIGN PATENT DOCUMENTS

| | | |
|---|---|---|
| EP | 0 622926 | 11/1994 |
| EP | 1501326 A1 | 1/2005 |
| WO | WO 98/27748 | 6/1998 |
| WO | WO 98/31133 | 7/1998 |
| WO | WO 99/35753 | 7/1999 |
| WO | WO 99/46734 | 9/1999 |
| WO | WO 00/31725 | 6/2000 |
| WO | WO 00/55843 | 9/2000 |
| WO | WO 01/80030 | 10/2001 |
| WO | WO 02/19623 | 3/2002 |

OTHER PUBLICATIONS

International Search Report for International Application No. PCT/US03/27254 dated Feb. 3, 2004 (5 pgs.).

Multichannel News , MoCA Brewing Up Bigger Bandwidth, Dec. 15, 2008 Interview with CTO Anton Monk, http://www.multichannel.com/article/160878-MoCa_Brewing_Up_bigger_Bandwidth.php downloaded on Mar. 29, 2009.

* cited by examiner

SYSTEM AND METHOD FOR RETRANSMITTING PACKETS OVER A NETWORK OF COMMUNICATION CHANNELS

REFERENCE TO CO-PENDING APPLICATIONS

This is a nonprovisional of the following U.S. Provisional Applications, all of which are hereby incorporated by reference herein in their entireties: U.S. Provisional Application No. 60/866,532, entitled, "A METHOD FOR PACKET AGGREGATION IN A COORDINATED HOME NETWORK", filed on Nov. 20, 2006, U.S. Provisional Application No. 60/866,527, entitled, "RETRANSMISSION IN COORDINATED HOME NETWORK" filed on Nov. 20, 2006, U.S. Provisional Application No. 60/866,519, entitled, "IQ IMBALANCE CORRECTION USING 2-TONE SIGNAL IN MULTI-CARRIER RECEIVERS", filed on Nov. 20, 2006, U.S. Provisional Application No. 60/907,111, "SYSTEM AND METHOD FOR AGGREGATION OF PACKETS FOR TRANSMISSION THROUGH A COMMUNICATIONS NETWORK" filed on Mar. 21, 2007, U.S. Provisional Application No. 60/907,126, entitled, "MAC TO PHY INTERFACE APPARATUS AND METHODS FOR TRANSMISSION OF PACKETS THROUGH A COMMUNICATIONS NETWORK", filed on Mar. 22, 2007, U.S. Provisional Application No. 60/907,819, entitled "SYSTEMS AND METHODS FOR RETRANSMITTING PACKETS OVER A NETWORK OF COMMUNICATION CHANNELS", filed on Apr. 18, 2007, and U.S. Provisional Application No. 60/940,998, entitled "MOCA AGGREGATION", filed on May 31, 2007.

FIELD OF THE INVENTION

The present invention relates generally to information networks and specifically to transmitting information such as media information over communication lines such as coaxial conductor cables (hereinafter, "coax").

BACKGROUND OF THE INVENTION

Home networking over coax is a known technology which has vast commercial potential.

The Multimedia over Coax Alliance ("MoCA™"), at its website mocalliance.org, provides an example of a suitable specification (MOCA 1.0) for transmitting digital video and entertainment information through coaxial cable deployed in a building, home or other structure or region. The specification has been distributed to an open membership.

MoCA 1.0 is but one example of a suitable home networking technology. MoCA and similar technologies tap into the unused bandwidth available on deployed coax. More than 70% of homes in the United States have deployed coax. Many have coax in one or more primary entertainment locations, such as family rooms, media rooms and master bedrooms. MoCA or other suitable technologies allow homeowners to utilize the coax as a networking system and to deliver other entertainment and information programming with high quality of service ("QoS").

The technology underlying MoCA, for example, provides high speed (270 mbps), high QoS, and the innate security of a shielded, wired connection combined with state-of-the-art packet-level encryption. Coax is designed for carrying high bandwidth video. Today, it is regularly used to securely deliver millions of dollars of pay-per-view and premium video content on a daily basis. The MoCA network, or other similar suitable networks, can also be used as a backbone for multiple wireless access points used to extend the reach of wireless communication throughout a home.

MoCA, or other similar suitable technologies, can typically provide a consistent, high throughput, high quality connection through deployed coaxial cables to video devices in the home without affecting the analog or digital services present on the cable. MoCA provides a primary link for digital entertainment, and may also act in concert with other wired and wireless networks to extend entertainment throughout the home.

MoCA works with access technologies such as ADSL and VDSL services or Fiber to the Home (FTTH), that typically enter the home on a twisted pair or on an optical fiber, operating in a frequency band from a few hundred kilohertz to 8.5 MHz for ADSL and 12 MHZ for VDSL. As services reach the home on via xDSL or FTTH, they may be routed via MoCA technology and the in-home coax to the video devices. Cable functionalities, such as video, voice and Internet access, may be provided to homes, via coaxial cable, by cable operators, and use coaxial cables running within the homes to reach individual cable service consuming devices locating in various rooms within the home. Typically, MoCA type functionalities mm in parallel with the cable functionalities, on different frequencies.

Coax infrastructure inside a house typically includes coaxial wires and splitters. Splitters used in homes typically have one input and two or more outputs and are designed to transfer signals from input to outputs in the forward direction, or from outputs to input in the backward direction and to isolate splitter outputs and prevent signals from flowing room/outlet to room/outlet. Isolation is useful in order to a) reduce interference from other devices and b) maximize power transfer from Point Of Entry (POE) to outlets for best TV reception.

The MoCA technology is specifically designed to go backwards through splitters (insertion) and go from splitter output to output (isolation). All outlets in a house can be reached from each other by a single "isolation jump" and a number of "insertion jumps". Typically, isolation jumps have an attenuation of 5 to 40 dB and each insertion jump attenuates approximately 3 dB. MoCA has a dynamic range in excess of 55 dB while supporting 200 Mbps throughput. Therefore MoCA can work effectively through a significant number of splitters.

MoCA is a managed network unlike some other home networking technologies. It is specifically designed to support streaming video without packet loss providing very high video quality between outlets.

Digital cable programming is delivered with threshold Packet Error Rate (PER) of below 1e-6. The home network may preferably have similar or better performance so as not to degrade viewing.

The disclosures of any publications and patent documents mentioned in the specification, and of the publications and patent documents cited therein directly or indirectly, are hereby incorporated by reference.

BRIEF DESCRIPTION OF THE DRAWINGS

The above and other features of the present invention, its nature and various advantages will be more apparent upon consideration of the following detailed description, taken in conjunction with the accompanying drawings, and in which.

DETAILED DESCRIPTION OF PREFERRED EMBODIMENTS

The present invention provides improved systems and methods for streaming media over coax.

Some embodiments of the invention may include a system for transmitting packets over a network of communication channels. The system may include a set of nodes comprising at least first and second nodes and a network access coordinator operative to coordinate the access of the set of nodes to a synchronous network of channels, wherein, if at least one individual packet has been transmitted from the first node to the second node which did not receive at least one packet, the second node is operative to send a retransmission request to the network access coordinator requesting retransmission of at least one individual packet.

The network may have a Coordinated MAC to allow contention free access. The coordinated MAC may be a home network coordinated MAC such as, for example, that described in the MoCA MAC/PHY SPECIFICATION v. 1.0 ("the MoCA Specification"), Feb. 22, 2006, which is hereby incorporated herein in its entirety. The MoCA Specification identifies features of a home network over existing coaxial cable. The method may allow the expansion of the coordinated network MAC to other media in the home like power lines and phone lines (or wireless) to improve the accessibility of the network to rooms in the home that are not accessible via coaxial cables.

The retransmission request for an individual packet which failed to transmit in MAP cycle N may occur in MAP cycle N+1.

The network access coordinator may be operative to receive and to accede to the retransmission request.

The retransmission of an individual packet which failed to transmit in MAP cycle N may occur in MAP cycle N+2.

Some embodiments of the invention may include a system for transmitting packets over a network of communication channels. The system may include a set of nodes interconnected by a synchronous network of channels and a network access coordinator operative to coordinate the access of the set of nodes to the synchronous network of channels including providing a plurality of slots in each MAP cycle for packet transmission requests sent to the coordinator by individual nodes in the set of nodes, and wherein at least one individual node in the set of nodes is operative to utilize an individual slot from among the plurality of slots to transmit to the coordinator both a reservation request and a retransmission request, the reservation request including a request to transmit a first packet to a first additional node and the retransmission request including a request that a second additional node retransmit a second packet previously unsuccessfully transmitted from the second additional node to the individual node.

In some embodiments, the network access coordinator may be operative to provide a plurality of slots in each MAP cycle for packet transmission requests sent to the coordinator by individual nodes in the set of nodes. At least one individual node in the set of nodes may be operative to utilize an individual slot from among the plurality of slots to transmit to the coordinator both a reservation request and a retransmission request, the reservation request including a request to transmit a first packet to a first additional node and the retransmission request including a request that a second additional node retransmit a second packet previously unsuccessfully transmitted from the second additional node to the individual node.

In some embodiments, if a plurality of packets have been transmitted from the first node to the second node which did not receive at least some of the plurality of packets, the second node may be operative to send a single burst to the network access coordinator. The burst may include retransmission requests requesting retransmission of those packets from among the plurality of packets which were not received.

In some embodiments, a retransmission request sent by the second node in a MAP cycle N may requests retransmission of only those packets which were not received by the second node in a previous MAP cycle N−1.

In some embodiments, overhead information which is common to the reservation request and the re-transmission request may be transmitted by the individual node to the coordinator only once.

In some embodiments, if the first node sent the second node, in a MAP cycle N−1, an aggregation frame including a plurality of packets only some of which were received by the second node, in MAP cycle N, the second node may refrain from requesting retransmission of those packets, from among those sent in MAP cycle N−1, which were successfully received and successfully de-aggregated by the second node.

In some embodiments, at least one retransmission request may include an indication of a slot duration to be used to retransmit the individual packet.

In some embodiments, if the first node sent the second node, in a MAP cycle N−1, an aggregation frame including a plurality of packets only some of which were received by the second node, the retransmission request sent by the second node to the network access coordinator may request retransmission of less than all of the plurality of packets and may include an indication, computed by the second node, of a slot duration to be used to retransmit the packets for which retransmission is requested.

In some embodiments, a retransmission request sent by the individual node in a MAP cycle N requests retransmission of only those packets which were not received by the individual node in a previous MAP cycle N−1.

In some embodiments, if in a MAP cycle N−1, the second additional node sent the individual node an aggregation frame including a plurality of packets, only some of which were received by the individual node, in MAP cycle N, the individual node may refrain from requesting retransmission of those packets, from among those sent in MAP cycle N−1, which were successfully received and successfully de-aggregated by the individual node.

In some embodiments, if in a MAP cycle N−1, the second additional node sent the individual node an aggregation frame including a plurality of packets only some of which were received by the individual node, the retransmission request sent by the individual node to the network access coordinator may request retransmission of less than all of the plurality of packets and may include an indication, computed by the individual node, of a slot duration to be used to retransmit the packets for which retransmission is requested.

Some embodiments of the invention may include a method for transmitting packets over a network of communication channels. The method may include coordinating the access of a set of nodes to a synchronous network of channels interconnecting the set of nodes. The coordinating may include providing a plurality of slots in each MAP cycle for packet transmission requests sent to a coordinator by individual nodes in the set of nodes. In some embodiments, at least one individual node in the set of nodes may be operative to utilize an individual slot from among the plurality of slots to transmit to the coordinator both a reservation request and a retransmission request, the reservation request including a request to transmit a first packet to a first additional node and the retransmission request including a request that a second additional node retransmit a second packet previously unsuccessfully transmitted from the second additional node to the individual node.

Some embodiments may include a method for transmitting packets over a network of communication channels. The method may include coordinating the access of a set of nodes, which may include at least first and second nodes, to a synchronous network of channels interconnecting the set of nodes. In some embodiments, if at least one individual packet has been transmitted from the first node to the second node which did not receive at least one packet, the second node may be operative to send a retransmission request to a network access coordinator requesting retransmission of at least one individual packet.

Typically, as a result of the de-aggregation process, the Rx node knows the size of a frame since size information is included in the frame's header. The Rx node may know some or all of the sizes of the individual packets in the frame either because this information was included in packet headers, and the packet headers were received even if their associated packets were not, or because the information regarding sizes of packets was included in the frame header. If a particular packet size is not known, the Rx node typically requests that all packets from that packet onward be re-transmitted. If all packet sizes are known, the Rx typically requests re-transmission only of missing packets and easily indicates a suitable slot duration as the sum of the known sizes of all missing packets.

Positive or Negative Acknowledgements for properly received packets are typically effected via the Reservation Request messages from the receiving node to the network coordinator.

An acknowledgment message ("ACK") is typically a single message referring to a burst of received packets. In the context of packet aggregation distinct negative acknowledgment messages ("NACKs") typically correspond to individual packets in the aggregated received burst.

The network coordinator may include an Automatic Retransmission reQuest ("ARQ") mechanism. If so, it may be used as a proxy to convey one or more ACK messages to the transmitting node and to retransmit one or more improperly received packets. The ARQ mechanism typically does not require additional bandwidth, in contrast to conventional retransmission mechanisms.

Some embodiments of the invention may include a method for retransmitting a packet before initial transmission of a next-queued packet. Packet order is thus retained by not transmitting the next-queued packet before receiving an acknowledgement of the already-transmitted packet.

Table 1 lists abbreviations that are used in the description and FIGS. herein.

TABLE 1

| Acronym | Term |
| --- | --- |
| RP | Retransmission Protocol |
| R-ACK | Receipt Acknowledgement |
| RTR | Retransmission Request |
| RQ-T | Retransmission Request Transmitter |
| RQ-S | Retransmission Request Signal |
| RQ-C | Retransmission Request Coordinator |
| ARQ | Automatic Retransmission request |
| MAP | Medium Access Plan |
| ACK | Acknowledgment Message |
| NACK | Negative Acknowledgment Message |
| RR | Retransmission Request |
| P#Z | Packet No. Z |
| X → Y | Information being transmitted from Node X to Node Y |

Figure 1:
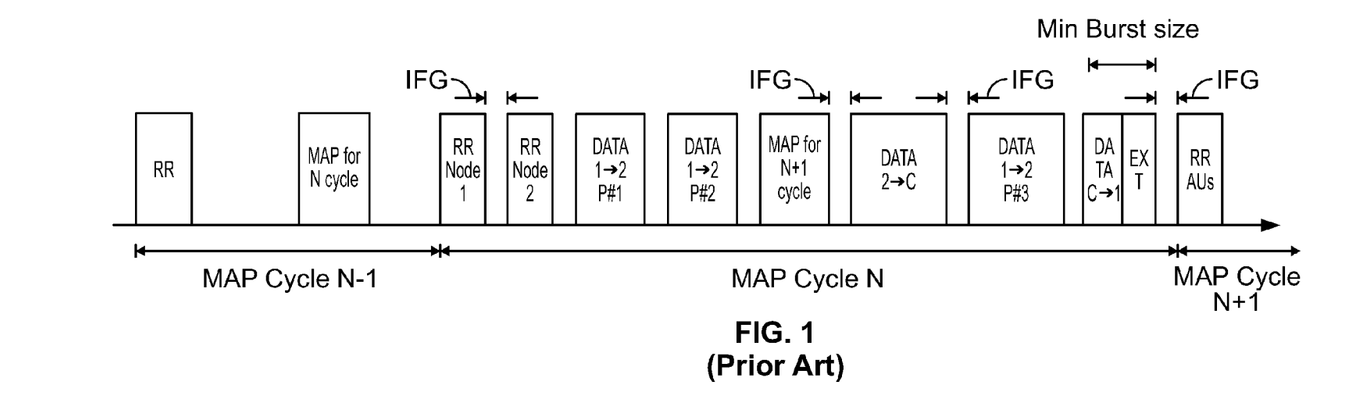
FIG. 1 is a prior art timing diagram.

FIG. 1 shows a timing diagram corresponding to one example of a MAC access method for an illustrative coordinated network. A network coordinator controls access to network media by allocating transmission opportunities to all network terminals. The coordinator thereby reduces or eliminates the likelihood that there will be contention in the network. The coordinator may assign priorites to the transmission of information based on information source, content, affect on QoS or any other suitable criterion. Some coordinated networks have collision-free periods as well as collision periods. Others, such as those governed by the MoCA Specification, have only collision free periods.

One prior art MAC Access Method is described in the MoCA MAC/PHY SPECIFICATION v1.0, Feb. 22, 2006. FIG. 1 shows the MoCA MAC schema for coordination of network access by a network coordinator. The access time is divided into MAP cycles which are managed by the network coordinator. Access rules for a MAP cycle may be defined in a MAP message sent in a previous MAP cycle by the network coordinator to all nodes.

The FIG. 1 example includes three network nodes: coordinator, node 1 and node 2. The coordinator sends transmission opportunities for MAP cycle N in the MAP message of the MAP cycle N−1. Illustrative opportunities and some corresponding illustrative precedents that may be associated with the timing diagram of FIG. 1 are summarized in Table 2.

TABLE 2

| Opportunity number | Opportunity | Precedent |
| --- | --- | --- |
| 1 | Reservation request ("RR") for node #1 | |
| 2 | RR for node #2 | |
| 3 | First data packet transmitted by node #1 to node #2 | Based on a MAP cycle N-1 node #1 request granted in the MA message of that cycle by the coordinator. |
| 4 | Second packet transmitted by node #1 to node #2 | |
| 5 | MAP message for cycle N + 1 (sent by coordinator) | Based on RR received Opportunities Nos. 1 and 7. |
| 6 | Data transmitted from node #2 to coordinator | |
| 7 | Third data packet transmitted by node #1 to node #2 | |

TABLE 2-continued

| Opportunity number | Opportunity | Precedent |
|---|---|---|
| 8 | Data transmitted from coordinator to node # 1 | |
| 9 | Extension packet | May be included if the data in opportunity 9 is less than a minimum burst size. |

Typically, there is an Inter Frame Gap (IFG) between any two bursts transmitted, and there is a minimum burst size. If data size is smaller than the Min Burst Size an extension packet size may be allocated as shown in FIG. 1.

The IFG as well as the Min Burst Size typically cause additional overhead and reduce the effective data rate of the network, however, they contribute toward reliable operation of the modem.

Retransmission is useful for increasing the robustness of data transfers, because a packet that was received with an error can be retransmitted. In particular, retransmissions are common in media that are susceptible to impulse noises. Impulse noises are created by home appliances as well as other noise sources and are received on wired media such as phone lines and power lines. Other media, such as Ethernet CAT5 wires and coaxial wires, are much less susceptible to impulse noises due to their better isolation from external noises. An impulse noise can be high enough in amplitude and long enough in time to cause packet errors or even packet loss.

If a coordinated network is to operate over noisy media (such as telephone lines or power lines) a Retransmission Protocol ("RP") is typically employed to provide appropriate network performance. The coordinated network shown in FIG. 1 is designed to operate over "quiet" media. An example of a network designed to provide a robust and reliable home networking over coaxial cables is that described the MoCA Specification. Embodiments of the invention may include providing an RP in connection with a coordinated network protocol, such as that set forth in the MoCA Specification. The methods described herein may be used efficiently in conjunction with the MoCA Specification in other suitable media, such as power lines and phone lines.

In some embodiments of the invention, the network coordinator may select from several retransmission protocols. One protocol may be set as a default method that is implemented by all nodes. A general algorithm for an RP is as follows:
1. The transmitting node transmits a packet or several packets and waits for an acknowledgement;
2. A. If the receiving node receives the packet correctly, the receiving node sends a Receive Acknowledgement (R-ACK).
   B. If the receiving node does not receive the packet correctly, the receiving node sends a Retransmission Request (RTR).
3. The transmitting node, upon receiving an R-ACK or RTR, retransmits the packet.
4. The transmitting node retransmits the package if neither an R-ACK nor RTR were sent.

The maximum number of retransmissions is typically a parameter of a data stream. The stream may include video data. The stream may include voice data. The stream may include browsing data. The stream may include any suitable type of data. After the transmitting node has sent the maximum number of retransmissions, no further attempts to transmit the packet are made. The receiving node typically forwards the received packets in the order of transmission by the transmitting node. If a packet is missing, the receiver node typically does not forward the next packet until the missing packet is received unless the maximum number of retransmissions has been reached.

Five illustrative ARQ protocol-based methods, and three more general retransmission methods based thereupon, are now described. In some embodiments of the invention, nodes may select an ARQ protocol during the establishment of a connection. One of the options is typically set as a default method that is implemented by all nodes. For example, Method #1 can be the default method. In general, ARQ protocols follow an algorithm such as:
1. The transmitting node sends a reservation request ("RR") corresponding to an expected transmission of a packet. If ARQ is employed, the node so signifies in the RR.
2. The transmitting node transmits the packet and waits for an ACK.
3. The receiving node receives the packet and checks if it has been received correctly.
4. If the packet has been received correctly the receiving network sends an ACK.
5. If the packet has been received incorrectly, or not at all, the receiving node either sends a NACK or does not reply.
6. Upon receiving an ACK or a NACK, the transmitting node decides whether to retransmit the packet or not. If neither ACK nor NACK were received the transmitted node may retransmit the packet.
7. The number of retransmissions is a parameter of the connection.

Figure 2:
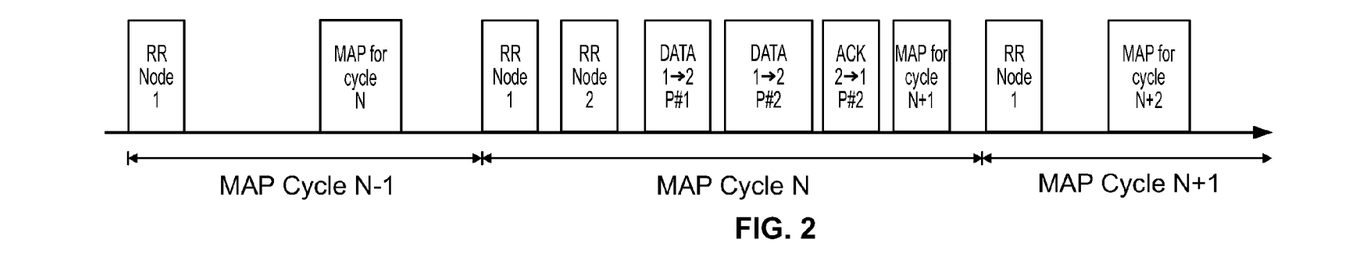
FIG. 2 is an illustrative timing diagram in accordance with the principles of the invention.

FIG. 2 shows illustrative method 1 (Immediate ARQ), which may include some or all of the following steps in a suitable order:
1. The transmitting (TX) node in its reservation request (RR) requests to transmit a packet to the receiving node indicating that transmission is under ARQ.
2. The coordinator allocates two time slots for the transmission of this packet. The first slot is for transmission of the packet by the TX node. The second slot is for transmission of the ACK/NACK message by the receiving (RX) node immediately following the TX. In some embodiments, the coordinator allocates slots that are equal to a minimum burst size.
3. The TX node sends the packet after the TX node receives a grant message indicating that coordinator granted a RR for the packet.
4. The RX node sends the ACK/NACK in the second slot.
5. The TX analyzes the ACK/NACK message and, if NACK is received, in the next RR opportunity the TX node request for retransmission the packet.
6. The coordinator receives the RR and grants the request if the maximum number of retransmission requests has not yet been reached.
7. If granted, the TX node retransmits the packet in the next MAP cycle.
8. This procedure can repeat itself several times according to the parameters of the ARQ of this connection.

Figure 3:
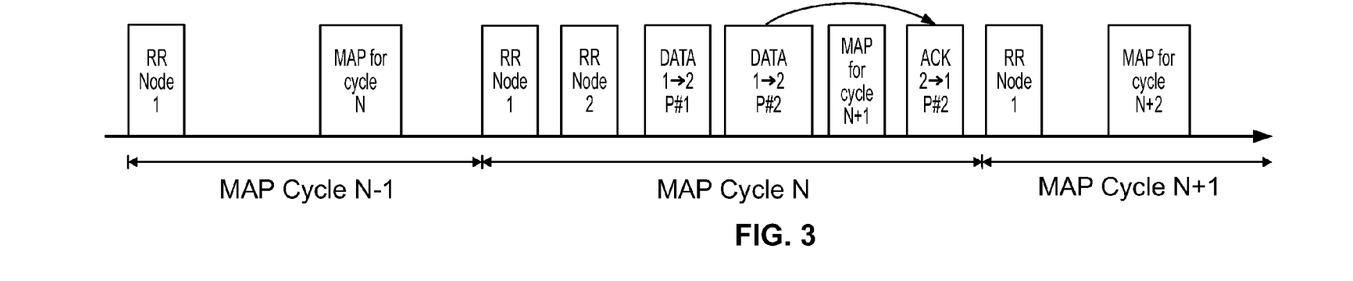
FIG. 3 is another illustrative timing diagram in accordance with the principles of the invention.

FIG. 3 shows illustrative method 2 (Single Frame ARQ), which may be similar to method 1 (shown in FIG. 2), except that the allocation for the ACK/NACK message does not necessarily immediately follow the TX node transmission.

Figure 4:
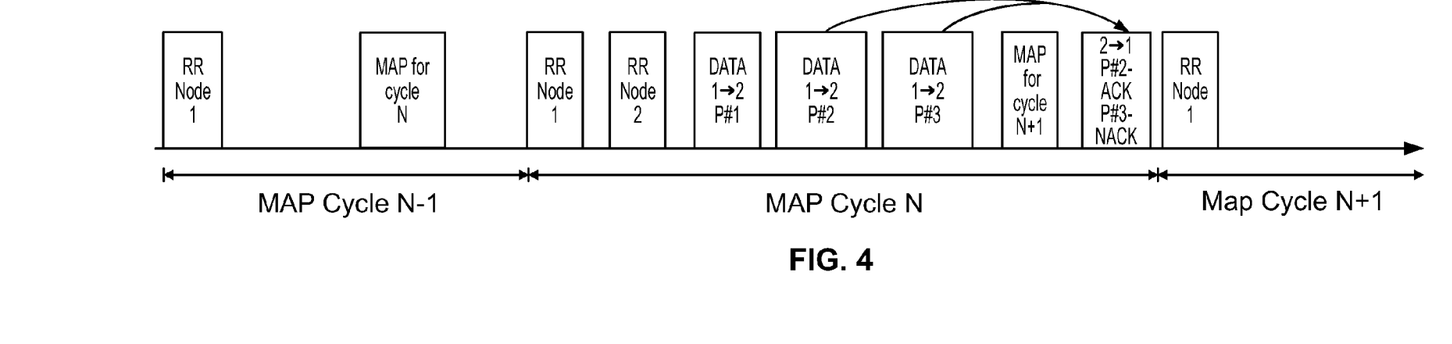
FIG. 4 is yet another illustrative timing diagram in accordance with the principles of the invention.

FIG. 4 shows illustrative method 3 (Multiple Frame ARQ), which may be similar to method 2, except that one ACK/NACK is sent to acknowledge in aggregate more than one received packet. For example, FIG. 4 shows an ACK for packet 2 and a NACK for packet 3.

Figure 5:
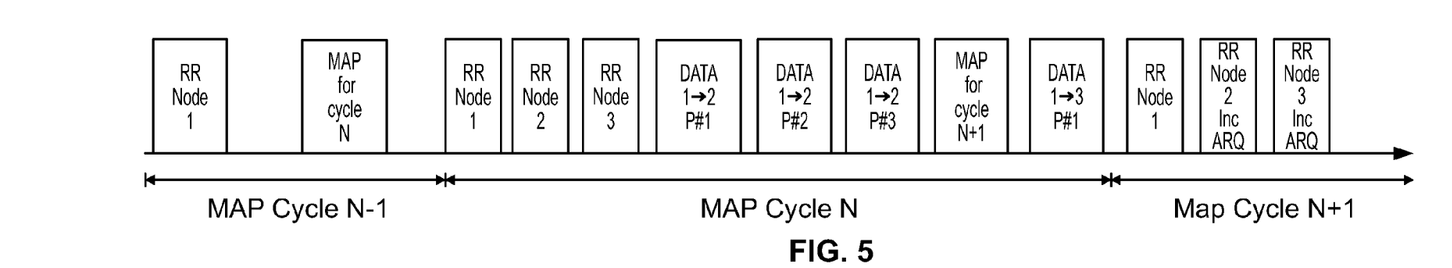
FIG. 5 is still another illustrative timing diagram in accordance with the principles of the invention.

FIG. 5 shows illustrative method 4 (ACK/NACK Embedded in RR-included in ARQ messages) enables more efficient ARQ throughput. The ACK/NACK message is not transmitted on its own and instead is embedded in the RR message of the RX node in MAP cycle N+1. When RR messages are shorter than the Min Burst Size time, additional overhead for the ACK/NACK may be conserved (although higher latency may be involved).

Figure 6:
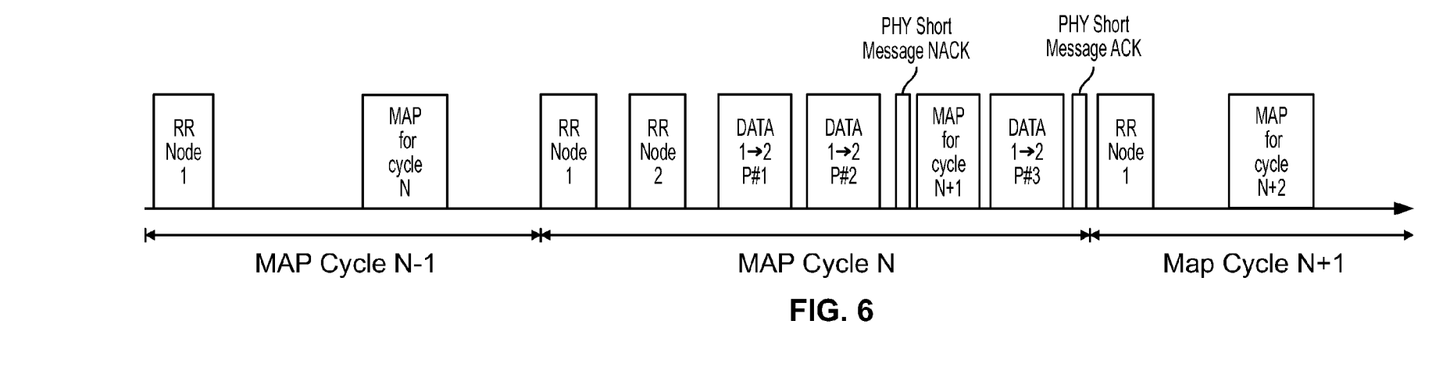
FIG. 6 is another illustrative timing diagram in accordance with the principles of the invention.

FIG. 6 shows illustrative method 5 (Very short Immediate ACK/NACK), which may be similar to Method 1, except that the ACK NACK is a very short message, such as a 64 bit BPSK series that is detected by the PHY. This is efficient with respect to throughput, but may require changes to the PHY and fast response to detection of error (or no error) by transmission of the short ACK/NACK.

Figure 7:
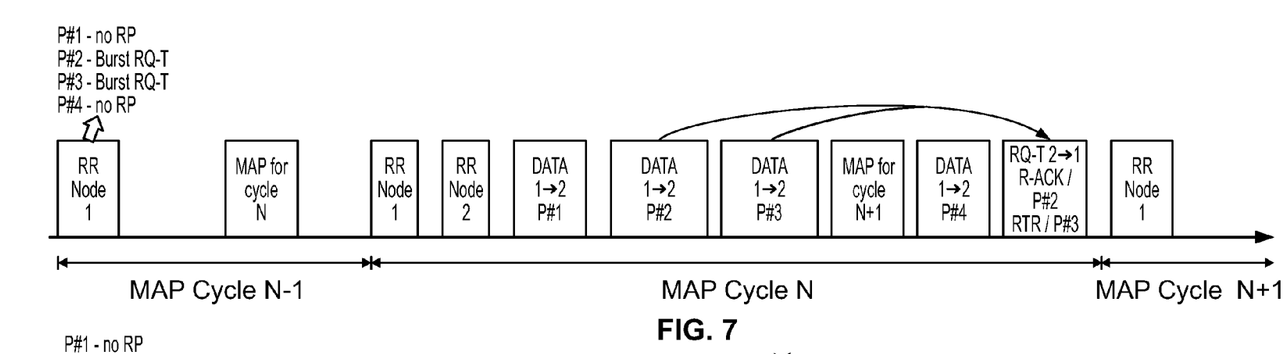
FIG. 7 is an illustrative timing diagram in accordance with the principles of the invention.

FIG. 7 shows illustrative method 6 (Retransmission Request Transmitter (RQ-T)), which may be operative to send single or burst R-ACK/RTR message to the transmitter. In some embodiments of the invention, the method may include some or all of the following steps in a suitable order such as the following:

1. The transmitting (TX) node in its reservation request (RR) requests to transmit one or multiple frames to the receiving node.
2. The transmitting node indicates in the RR the following information:
   A. An indication that the frame is in Retransmission Protocol;
   B. An indication that the method of RP is preferred over RQ-T; and
   C. Single or burst RQ-T.
3. The coordinator allocates slots for the transmission and RP of the frames typically in one of the following orders:
   A. If single RQ-T is used, a slot is allocated for transmission of the first frame by the TX node, a slot is then allocated for transmission of the single RQ-T message by the RX node, and finally, slots are allocated for the rest of the frames deemed "required" by the TX node.
   B. If a burst of RQ-T is used, slots are allocated for transmission of all frames deemed "required" by the TX node, and one slot is then allocated for transmission of the burst RQ-T message by the RX node.
3.1 In some embodiments, the coordinator may be operative to allocate one or more slots for an RQ-T message immediately after a packet or packets that required RQ-T or in a corresponding or subsequent MAP.
4. The coordinator indicates to the RX node which frames are to be acknowledged in each RQ-T message.
5. The TX node sends the frames according to the grant received from the coordinator.
6. The RX node sends an RQ-T message in the RQ-T slots granted by the coordinator.
7. The RQ-T message is sent, with an indication of R-ACK or RTR, for frames that requested acknowledgment in that specific RQ-T message.
8. The TX node analyzes the RQ-T message and may, if application-appropriate, add an RR element in the next RR transmission for retransmission of the frames missed by the RX node.
9. The coordinator receives the RR and may grant the slot according to the above steps.
10. The foregoing actions may be repeated several times, provided that the maximum number of retransmissions is not exceeded.

Figure 8:
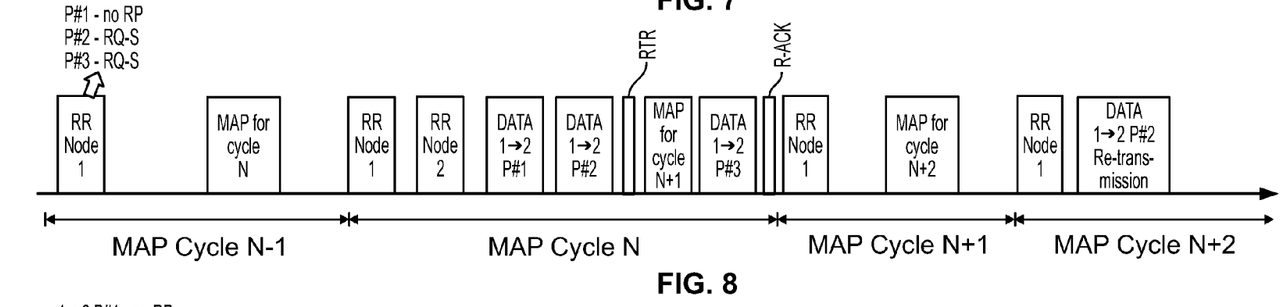
FIG. 8 is another illustrative timing diagram in accordance with the principles of the invention.

FIG. 8 shows illustrative method 7 (Retransmission Request Signal (RQ-S)), which may be operative to send single R-ACK/RTR signal to the transmitter. In some embodiments, the RQ-S may include a short signal with an indication of R-ACK or RTR which may be allocated immediately following each burst requiring retransmission under the RQ-S method. Method 7 typically comprises some or all of the following steps in a suitable order such as the following:

1. The transmitting (TX) node in its reservation request (RR) requests to transmit one or multiple of frames to the receiving node.
2. The transmitting node indicates in the RR the following information:
   A. An indication that the frame is in Retransmission Protocol; and
   B. An indication that the RP method is preferred over the RQ-S method.
3. The coordinator allocates, for each burst with RQ-S, the slot for transmission of the frame by the TX node and the slot for transmission of the RQ-S signal by the RX node.
4. The coordinator and the RX node check whether the RQ-S signal bears an indication of R-ACK or RTR.
5. If the RQ-S indicates R-ACK, the TX node clears the packet.
6. If the RQ-S indicates RTR, the coordinator allocates a slot for retransmission of the frame by the TX node.
7. If the coordinator has not received the RQ-S and the TX node receives it with R-ACK, the coordinator allocates a slot for retransmission and the TX node sends an empty frame.
8. If the TX node has not received the RQ-S and the coordinator receives it with an R-ACK indication, the coordinator indicates that the frame was received correctly in the next allocation slot of the flow.
9. The R-ACK or RTR indication is on the whole frame with no indication per packet if the frame is aggregate.

A short RQ-S signal is easy to distinguish from other network signals. A short RQ-S may use a commonly known (MoCA, e.g.) PHY preamble used by the network with different parameters. For example, an RQ-S with R-ACK indication may comprise 8 S signals followed by 4 L2 series followed by an inverted 4 L2 series followed by an S quiet period and two L1 sequences. An RQ-S with RTR indication may comprise 8 S signals followed by 4 L2 series followed by inverted 4 L2 series followed by an S quiet period and two L4 sequences, such as that shown below.

$$S = \{0, 1, 1, 1, 0, 0, 0, 0, 1, 0, 0, 0, 0, 1, 1, 1, 1, 1, 0, 0, 0, 1, 0, 0, 1, 1, 1, 1, 1, 0\}$$

$$L4 = \begin{Bmatrix} 1, 0, 0, 1, 0, 1, 1, 1, 0, 1, 1, 1, 1, 0, 1, 0, 0, 0, 1, 1, 0, 1, 0, 1, 0, 1, 1, 0, 1, 1, 0, 0, 0, \\ 0, 1, 1, 1, 1, 1, 0, 0, 0, 1, 0, 0, 0, 0, 1, 1, 0, 0, 1, 1, 1, 0, 0, 0, 0, 1, 0, 1, 0, 0, 0, 0, 0, 0, 1 \end{Bmatrix}$$

$$L2 = \begin{Bmatrix} 1, 0, 1, 1, 1, 0, 0, 1, 1, 1, 1, 1, 0, 1, 1, 1, 1, 1, 1, 0, 0, 0, 0, 0, 0, 1, 0, 1, 0, 1, 0, 0, 0, 1, 1, \\ 0, 0, 1, 0, 0, 0, 0, 1, 0, 0, 1, 0, 1, 1, 0, 1, 1, 0, 0, 0, 0, 1, 1, 1, 1, 0, 1, 0, 0, 0, 0, 0, 1, 1, 0, 1 \end{Bmatrix}$$

-continued $$L1 = \left\{ \begin{array}{l} 0,0,0,0,0,0,1,0,1,0,1,0,0,1,1,0,0,1,0,0,0,1,0,0,1,0,1,1,0,1,1,0, \\ 0,0,1,1,1,0,1,0,0,0,0,1,1,0,1,0,1,1,1,0,0,1,1,1,1,0,1,1,1,1,1,0 \end{array} \right\}$$

Figure 9:
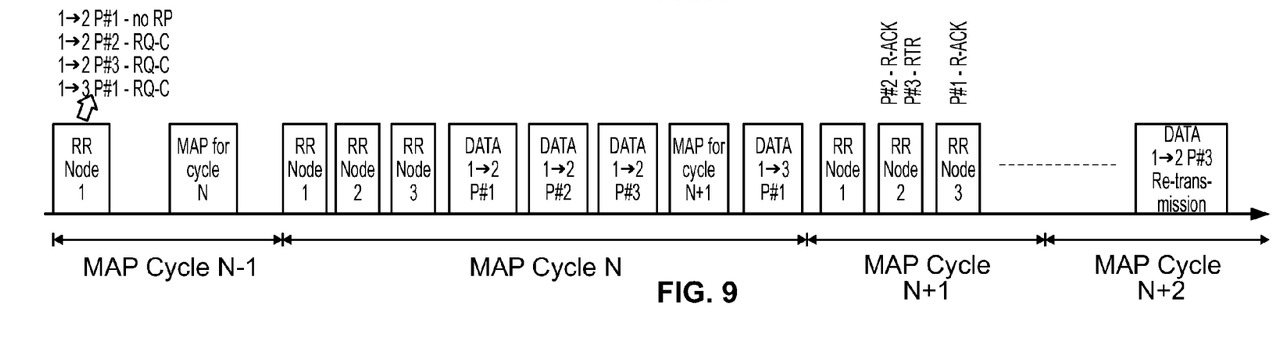
FIG. 9 is an illustrative timing diagram in accordance with the principles of the invention.
Figure 10:
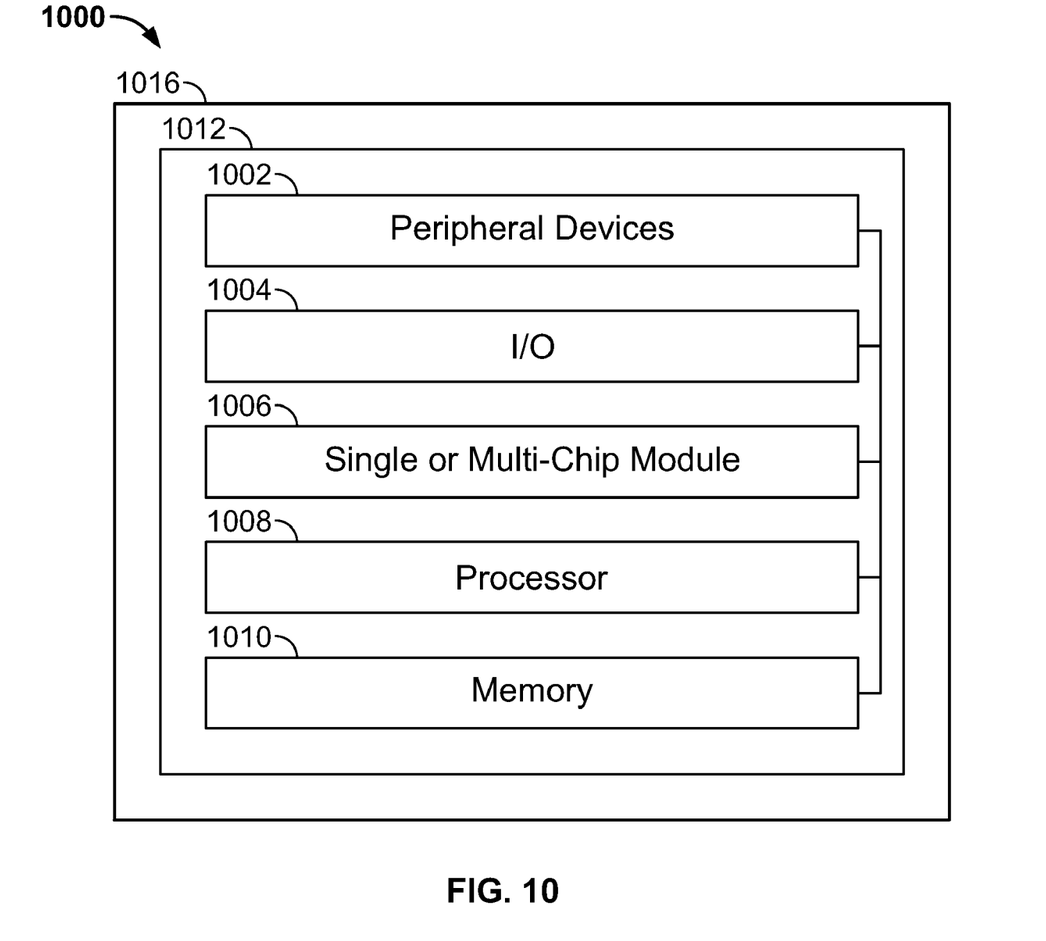
FIG. 10 shows schematically an illustrative device that may be used in accordance with the principles of the invention.

FIG. 9 shows illustrative method 8 (Retransmission Request Coordinator (RQ-C)), which may be operative to send burst R-ACK or RTR to the network coordinator. In some embodiments, the acknowledgement indication is typically sent to the coordinator in the Reservation Request Message. The method typically comprises some or all of the following steps in a suitable order such as the following:

1. The transmitting (TX) node in its reservation request (RR) requests to transmit one or multiple frames to the receiving node.
2. The transmitting node indicates in the RR the following information:
   A. That the frame is in Retransmission Protocol; and
   B. That the method of RP is preferred over RQ-C.
3. The coordinator allocates slots for transmission of the frames by the TX node.
4. In the next MAP cycle the coordinator allocates an RR slot for the RX node (even if the RX node does not need an RR slot for its TX frames).
5. The RX node checks which frames were received correctly and which were not, from all TX nodes sent to it in the previous MAP cycle.
6. The RX node sends, in the RR message, an R-ACK or RTR indication for all frames which employ RQ-C.
7. The RTR is typically sent with some or all of the following information:
   A. The sequence of frames for retransmission;
   B. If the frame was an aggregation frame and a portion of its packets was received incorrectly, send the packet sequence of the missed packets;
   C. The durations used for retransmission of these frames. If the whole frame is to be retransmitted, the duration may be taken from the RX data slot, whereas if only a portion of the frame is to be retransmitted, the duration may be computed according to the PHY profile of the TX and RX nodes.
8. In the next MAP cycle, the coordinator allocates slots to be used by the RX node for retransmission of the frames by the TX node.
9. If the R-ACK for some frames is sent in the RR message, the coordinator indicates in the next MAP that these frames were received correctly.
10. The TX node receives a MAP with slots for retransmission of the lost frames/packets and with an indication of which frames/packets were received correctly by the RX node.
11. The TX node clears frames/packets received correctly and retransmits lost frames/packet.
12. The RX node may re-send RTR for a specific frame/packet until a limit on the number of retransmissions is reached.
13. If the limit is reached, the frame/packet may still not have been received.

Methods 6 or 8 may be usable for high bit rate stream such as HD video.

Method 7 may be usable for low bit rate stream such as voice in which the RX node is only a listener. This method may reduce bandwidth when the RR is allocated infrequently or not at all for the TX or RX nodes. The RR is not allocated to the TX node when the stream is sent in an unsolicited manner.

Method 8 may save bandwidth for RP by merging the RP in the RR slots. To the extent that the RX node receives streams in RP, the saved time increases.

Figure 11:
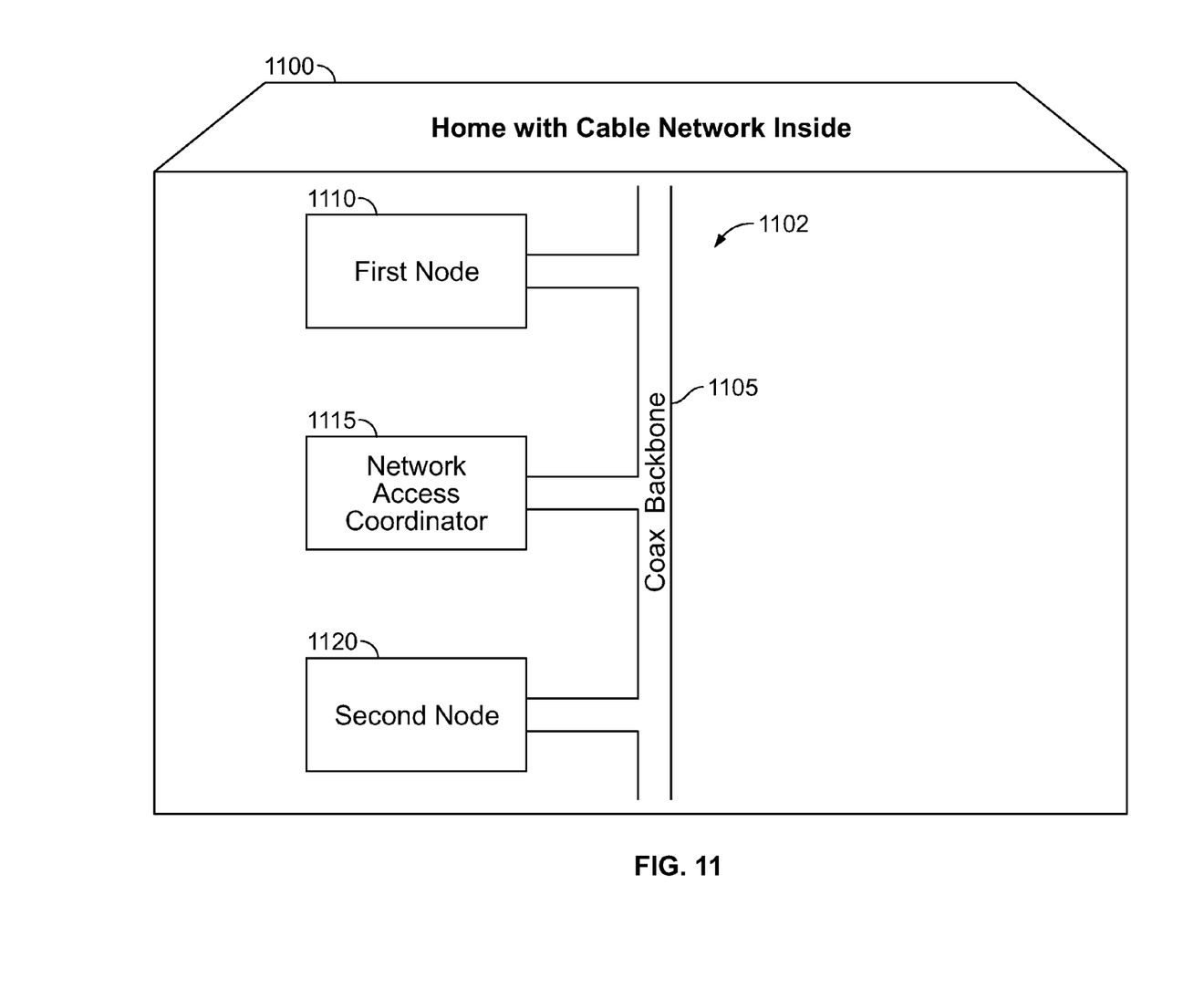
FIG. 11 shows an illustrative home network system in accordance with the principles of the invention.

FIG. 11 is a simplified block diagram illustration of a home network system 1102 that uses a coax backbone 1105. The home network system 1102 of FIG. 11 is operative for transmitting packets over coax backbone 1105 within a home 1100. The home network system 1102 includes first node 1110, second node 1120 and network access coordinator 1115. First node 1110, second node 1120 and network access coordinator 1115 are configured to communicate over coax backbone 1105.

It is appreciated that for clarity the description throughout the specification, including specific examples of parameter values provided herein, is sometimes specific to certain protocols such as the MoCA and/or Ethernet protocols however, this is not intended to be limiting and the invention may be suitably generalized to other cable protocols and/or other packet protocols. For example, use of terms, such as Map, Allocation Unit, Reservation Request etc. which may be specific to a particular protocol such as MoCA or Ethernet, to describe a particular feature or embodiment is not intended to limit the scope of that feature or embodiment to that protocol specifically; instead the terms are used generally and are each intended to include parallel and similar terms defined under other protocols.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques.

Features of the present invention which are described in the context of separate embodiments may also be provided in combination in a single embodiment. Conversely, features of the invention which are described for brevity in the context of a single embodiment may be provided separately or in any suitable subcombination.

What is claimed is:

1. A system for transmitting packets over a network of communication channels, the system comprising:
   first and second nodes in communication with a coax backbone; and
   a network access coordinator operative to coordinate access of the nodes to the coax backbone;
   wherein, if in a time period at least one first packet is transmitted by the first node to the second node, but is not received by the second node, the second node is operative to send a retransmission request to the network access coordinator, the request requesting packet retransmission;
   wherein the network access coordinator is operative to:
     receive the request; and
     accede to the request,
   and wherein the first node is operative to retransmit the packet in MAP cycle n+2.

2. A system for transmitting packets over a network of communication channels, the system comprising:
  first and second nodes in communication with a coax backbone; and
  a network access coordinator operative to coordinate access of the nodes to the coax backbone;
  wherein, if in a time period at least one first packet is transmitted by the first node to the second node, but is not received by the second node, the second node is operative to send a retransmission request to the network access coordinator, the request requesting packet retransmission, wherein:
    the time period is a Media Access Plan (MAP) cycle;
    the network access coordinator is operative to provide in a cycle a slot for packet transmission requests; and
    the first node is operative to utilize the slot to transmit to the coordinator:
    a first request to transmit a packet to the second node; and
    a second request that a third node retransmit a packet.

3. The system of claim 2 wherein, when the time period is Media Access Plan (MAP) cycle n, the request occurs in MAP cycle n+1.

4. The system of claim 2 wherein the network access coordinator is operative to:
  receive the request; and
  accede to the request.

5. The system of claim 2 wherein, when the at least one packet is a plurality of packets, the second node is operative to send a single burst to the network access coordinator, the burst including retransmission requests corresponding to each of the packets in the plurality.

6. The system of claim 2 wherein the retransmission request comprises a slot duration to be used to retransmit a first packet.

7. The system of claim 6 wherein the slot duration is computed by the first node.

8. The system of claim 2 wherein the retransmission request comprises a slot duration to be used to retransmit more than one first packet.

9. The system of claim 2 wherein the retransmission request comprises a slot duration to be used to retransmit all first packets.

10. A system for transmitting packets over a network of communication channels, the system comprising:
  first and second nodes in communication with a coax backbone; and
  a network access coordinator operative to coordinate access of the nodes to the coax backbone;
  wherein, if in a time period at least one first packet is transmitted by the first node to the second node, but is not received by the second node, the second node is operative to send a retransmission request to the network access coordinator, the request requesting packet retransmission, wherein:
    if the time period is Media Access Plan (MAP) cycle n−1; and
    in the cycle at least one second packet is transmitted by the first node to the second node, and is received by the second node, the retransmission request:
    is sent in MAP cycle n; and
    requests retransmission of only the first packet.

11. A system for transmitting packets over a network of communication channels, the system comprising:
  first and second nodes in communication with a coax backbone; and
  a network access coordinator operative to coordinate access of the nodes to the coax backbone;
  wherein, if in a time period at least one first packet is transmitted by the first node to the second node, but is not received by the second node, the second node is operative to send a retransmission request to the network access coordinator, the request requesting packet retransmission, wherein:
    the time period is Media Access Plan (MAP) cycle n−1;
    in the cycle at least one second packet is transmitted by the first node to the second node, and is received by the second node;
    the first and second packets are included in an aggregation frame;
    the second packet is successfully aggregated; and
    the retransmission request is:
    send in MAP cycle n−1; and
    does not request retransmission of the second packet.

12. A system for transmitting packets over a network of communication channels, the system comprising:
  first, second and third nodes in communication with a coax backbone;
  a network access coordinator in communication with the coax backbone, the coordinator operative to:
  coordinate access of the nodes to the coax backbone; and
  provide a request slot in a Media Access Plan (MAP) cycle;
  wherein the first node is operative to utilize the slot to transmit to the coordinator;
  a first request to transmit a packet to the second node; and
  a second request that the third node retransmit a packet;
    wherein, when there is information that is common to said first and second requests, the first node is operative to transmit the information only once.

13. A system for transmitting packets over a network of communication channels, the system comprising:
  first, second and third nodes in communication with a coax backbone;
  a network access coordinator in communication with the coax backbone, the coordinator operative to:
  coordinate access of the nodes to the coax backbone; and
  provide a request slot in a Media Access Plan (MAP) cycle;
  wherein the first node is operative to utilize the slot to transmit to the coordinator;
  a first request to transmit a packet to the second node; and
  a second request that the third node retransmit a packet;
    wherein, when in MAP cycle n−1:
    (a) at least one first packet is transmitted by the third node to the first node, but is not received by the second node; and
    (b) at least one second packet is transmitted by the first node to the second node, and is received by the second node; and
    the second request:
    is sent in MAP cycle q and
    requests retransmission of only the first packet.

14. The system of claim 13 wherein:
  the second request comprises a slot duration to be used to retransmit a first packet.

15. The system of claim 14 wherein the slot duration is computed by the first node.

16. The system of claim 13 wherein the second request comprises a slot duration to be used to retransmit more than one first packet.

17. The system of claim 13 wherein the second request comprises a slot duration to be used to retransmit all first packets.

18. A system for transmitting packets over a network of communication channels, the system comprising:
- first, second and third nodes in communication with a coax backbone;
- a network access coordinator in communication with the coax backbone, the coordinator operative to:
- coordinate access of the nodes to the coax backbone; and
- provide a request slot in a Media Access Plan (MAP) cycle;
- wherein the first node is operative to utilize the slot to transmit to the coordinator;
- a first request to transmit a packet to the second node; and
- a second request that the third node retransmit a packet;
  - wherein:
    - the first and second packets are included in an aggregation frame;
    - the second packet is successfully deaggregated; and
    - the second request does not request retransmission of the second packet.

19. A method for transmitting packets over a coax backbone, the method comprising providing a plurality of slots in a Media Access Plan (MAP) cycle for packet transmission requests sent to a coordinator by a first node in communication with the coax backbone, the node being operative to utilize at least one of the slots to transmit to the coordinator both a reservation request and a retransmission request, the reservation request including a request to transmit a first packet to a second node and the retransmission request including a request that a third node retransmit a second packet previously unsuccessfully transmitted from said third node to said first node.

* * * * *

UNITED STATES PATENT AND TRADEMARK OFFICE
CERTIFICATE OF CORRECTION

| | | |
|---|---|---|
| PATENT NO. | : 7,742,495 B2 | Page 1 of 1 |
| APPLICATION NO. | : 11/942114 | |
| DATED | : June 22, 2010 | |
| INVENTOR(S) | : Avi Kliger et al. | |

It is certified that error appears in the above-identified patent and that said Letters Patent is hereby corrected as shown below:

IN THE CLAIMS:

In Column 14, Line 15, Claim 11,

Replace "aggregated" with --deaggregated--.

Signed and Sealed this
Twenty-first Day of January, 2014

Michelle K. Lee
*Deputy Director of the United States Patent and Trademark Office*